United States Patent
Spierts et al.

(10) Patent No.: US 10,045,544 B2
(45) Date of Patent: Aug. 14, 2018

(54) METHOD FOR PREPARING FOOD PRODUCTS BY MEANS OF EXTRUSION

(75) Inventors: Léon Marie Francois Spierts, Maastricht (NL); Adrianus Josephes Van Den Nieuwelaar, Gemert (NL); Marcus Bernhard Hubert Bontjer, Aarle-Rixtel (NL); Patricia Rosa Maria Hoekstra-Suurs, Berghem (NL)

(73) Assignee: Marel Townsend Further Processing B.V., Boxmeer (NL)

( * ) Notice: Subject to any disclaimer, the term of this patent is extended or adjusted under 35 U.S.C. 154(b) by 982 days.

(21) Appl. No.: 13/884,780

(22) PCT Filed: Nov. 14, 2011

(86) PCT No.: PCT/NL2011/050777
§ 371 (c)(1),
(2), (4) Date: Aug. 29, 2013

(87) PCT Pub. No.: WO2012/078037
PCT Pub. Date: Jun. 14, 2012

(65) Prior Publication Data
US 2013/0337110 A1    Dec. 19, 2013

(30) Foreign Application Priority Data

Nov. 12, 2010 (NL) .................. 2005683
Nov. 12, 2010 (NL) .................. 2005684

(51) Int. Cl.
*A21D 13/00* (2017.01)
*A21D 8/04* (2006.01)
(Continued)

(52) U.S. Cl.
CPC ......... *A21D 13/0003* (2013.01); *A21D 8/042* (2013.01); *A21D 13/20* (2017.01); *A22C 13/0003* (2013.01); *A22C 13/0006* (2013.01)

(58) Field of Classification Search
CPC ............ A22C 13/0003; A22C 13/0006; A21D 13/0003; A21D 8/042
(Continued)

(56) References Cited

U.S. PATENT DOCUMENTS

2007/0218173 A1*  9/2007  Shulman et al. ............. 426/135
2009/0317522 A1* 12/2009  Nielsen et al. .............. 426/138

FOREIGN PATENT DOCUMENTS

GB          807863 A  *  1/1959
GB          807863 A      1/1959
(Continued)

OTHER PUBLICATIONS

Pavlath et al. Journal of Food Science, vol. 64, No. 1, 1999, pp. 61-63.*

*Primary Examiner* — Subbalakshmi Prakash
(74) *Attorney, Agent, or Firm* — Zarley Law Firm, P.L.C.

(57) ABSTRACT

The present invention relates to a method for preparing food products by means of extrusion, comprising the processing steps of: i) providing a food dough; ii) providing a viscous coating agent; iii) extruding a strand of food dough and extruding a coating layer at least partially enclosing the strand; iv) treating the at least partially coated strand with a liquid strengthening agent during at least two strengthening steps such that the coating layer of the strand is strengthened; to a device for performing this method and to the obtained food strand.

32 Claims, 1 Drawing Sheet

(51) Int. Cl.
  *A22C 13/00*  (2006.01)
  *A21D 13/20*  (2017.01)
(58) Field of Classification Search
  USPC .................................................. 426/94, 516
  See application file for complete search history.

(56) References Cited

FOREIGN PATENT DOCUMENTS

NL        1011830 C2    8/2000
NL        2001619 C2    11/2009

* cited by examiner

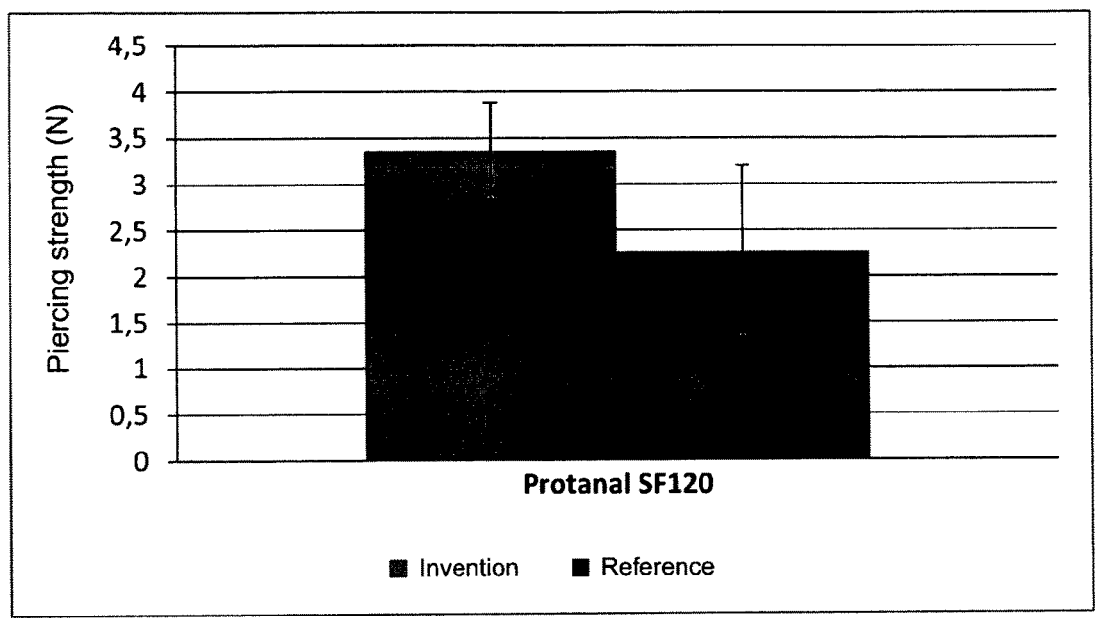

METHOD FOR PREPARING FOOD PRODUCTS BY MEANS OF EXTRUSION

BACKGROUND OF THE INVENTION

The present invention relates to a method for manufacturing food products by means of extrusion, to a device for performing such a method and to the obtained food products.

The general principle of producing foods by means of extrusion is already known in the prior art. It has become possible by means of extrusion to manufacture foods with a specific composition and shape at a relatively high production speed. Extrusion is particularly a much used method in the production of sausage.

A particular form of extrusion is so-called co-extrusion. The principle of co-extrusion in food products is described in, among others, Netherlands patent NL 6909339. This document describes the coating of a strand of food dough with a coating layer of collagen by means of co-extrusion. Following extrusion the coated strand is guided for strengthening purposes through a coagulation bath. Under the influence of the coagulation solution the collagen coagulates and/or precipitates and the coating layer is strengthened. A strand of food dough is thus formed which is at least partially coated with a strong coating layer of collagen.

In addition to proteins such as collagen, use is often also made in the food industry of polysaccharides, such as alginate, as coating agent for foods such as for instance sausage. The term alginate refers to a group of naturally occurring polysaccharides extracted from seaweed. In the presence of alkaline earth metals (such as, among others, magnesium and calcium) alginates can form gels relatively easily.

Studies have shown that the gelling of alginates under the influence of for instance calcium results due to the development of a three-dimensional structure. This is also referred to as the so-called egg-box model. When alginate is introduced into this three-dimensional structure, a relatively strong gel is created. Such a gel is highly suited to serve as coating layer of for instance a sausage.

In current practice a coating layer of alginate is often extruded onto a food dough strand in the making of sausage. The coating layer of the at least partly coated strand is then strengthened. This strengthening is done by guiding the extruded and coated strand through a salt bath containing calcium. Due to the presence of the calcium the coating agent (the alginate) will gel quickly and a strong coating layer forms on the food dough strand.

A drawback here however is that the coating agent undergoes rapid gelling on the outer surface such that calcium reaches the inner surface of the coating layer only with difficulty. In other words, due to the rapid gelling a gel layer forms on the outer surface of the coating layer which makes it difficult for sufficient calcium to permeate the coating layer. If insufficient calcium permeates the coating layer, a strong gel network resistant to the influence of sodium from the food dough strand does not form at the contact surface of the food dough and the coating layer. This may result in problems with shelf-life, texture and adhesion of the coating layer to the food dough strand. In order to solve this problem relatively high concentrations of calcium are generally used (from 10 to 15% by weight calcium salt). These high concentrations result in variations in taste, possibly a relatively high salt consumption, and corrosion of equipment.

BRIEF DESCRIPTION OF THE DRAWINGS

FIG. 1 is a graph of the piercing strength of a method for preparing food products by means of extrusion and the prior art.

SUMMARY OF THE INVENTION

In view of the above there is a need to be better able to influence the properties of the coating layer of extruded products, particularly the coating layer of sausages. In the prior art this has been done particularly by varying the composition of the coating agent. Relatively little attention has however been devoted to actually optimizing the strengthening treatments following extrusion.

An object of the present invention is therefore to provide a method for manufacturing extruded food products, particularly sausages, which method enables optimal control of the properties of the product at relatively high production speeds.

DETAILED DESCRIPTION OF THE PREFERRED EMBODIMENTS

A first aspect of the present invention relates to a method for preparing food products, preferably sausages, by means of extrusion, comprising the following processing steps of:
  i) providing a food dough;
  ii) providing a viscous coating agent;
  iii) extruding a strand of food dough and extruding a coating layer at least partially enclosing the strand;
  iv) treating the at least partially coated strand with a liquid strengthening agent during at least two strengthening steps such that the coating layer of the strand is strengthened. In a preferred variant the provided viscous coating agent comprises polysaccharides.

By making use of the above stated method it is possible to manufacture extruded food products with a strong coating layer. The food products manufactured using the method according to the invention hereby have a good overall texture, a well-constructed network structure of the coating layer and a good adhesion of the coating layer to the food dough.

Because the at least partially coated strand of food dough is subjected to at least two strengthening steps after extrusion it is possible, depending on the product being produced, to also control the strengthening very precisely at high production speeds. This was not possible in the prior art.

As described in NL 6909339, the extruded strand of food product was guided through one bath, whereby the strand, or at least the coating agent thereon, had to be strengthened. This bath comprised only one strengthening agent and did not have multiple compartments either. It was thus not possible to control the strengthening of the coating layer of the extruded strand of food dough in a very balanced manner. This is however possible using the present method. In a preferred embodiment of the extruder the strand of food dough leaves the extruder via a first outlet in the case of co-extrusion. Via a second outlet at least partially enclosing the first outlet the coating agent is arranged on the strand of food dough such that a coating layer is formed. The formed strand is then subjected according to the invention to at least two strengthening steps. Because in the method according to the present invention the at least partially coated strand of food dough is subjected to at least two strengthening steps after extrusion, it is possible, depending on the product being produced, to control the strengthening very precisely. This was not possible in the prior art.

The Netherlands patent NL1011830 describes a device and method for manufacturing extruded food products such as sausage. The extruded food dough strand is divided into separate units immediately following extrusion. The separate units, and not the strand, undergo further coagulation treatment. In contrast to the invention of NL 1011830 it is not necessary in the present invention to divide the strand into separate units before the coagulation treatment in order to enable good control of the properties of the product, including the coating layer. Higher production speeds can hereby be achieved, and a more uniform product is obtained. Emptying of the outer ends of the separate parts (sausages) is also prevented by making use of a strand in the strengthening treatments. The film layer of the strand has further become so strong through the strengthening treatments that the strand can be more easily separated into parts following the strengthening.

Netherlands patent NL 2001619 also relates to making extruded food products such as sausage. According to the invention of NL 2001619 a strand of food dough provided with a coating layer of polysaccharides, such as alginate, is placed in a strengthening bath, whereby the coating layer at least partially gels. The sausage strand is then divided into separate units and the separate units are subjected to one or more further strengthening steps. In contrast to the invention described in NL 2001619, it is not necessary in the present invention to divide the strand into separate units before the further strengthening steps in order to enable good control of the properties of the product, including the coating layer. Higher production speeds can hereby be achieved, and a more uniform product is obtained. Emptying of the outer ends of the separate parts (sausages) is also prevented. The film layer of the strand has further become so strong through the strengthening treatments that the strand can be more easily separated into parts following the strengthening.

The food dough as used in the described method can be manufactured from animal or vegetable products. The food dough preferably comprises a combination of animal and vegetable products such as meat, fish, poultry, vegetable, soy protein, milk protein or proteins from chicken eggs.

The viscous coating agent is suitable for extrusion to a coating layer. This preferably takes place by means of co-extrusion. The coating agent preferably comprises polysaccharides, proteins or combinations thereof. Polysaccharides which can be readily used in the present invention are alginates and cellulose, or derivatives thereof. It is also possible to use a combination of these or other polysaccharides. It is also possible to use proteins in the coating agent. Proteins particularly suitable for this purpose are collagen or milk protein. It is however also possible to use combinations of collagen and milk protein. It is further also possible to make use of a coating agent comprising proteins such as collagen as well as polysaccharides such as alginate.

The extrusion of the strand of food dough and a coating layer extending therearound preferably takes place by means of co-extrusion. A device and method herefor has already been described in Netherlands patent NL6909339. In a preferred embodiment of the extruder the strand of food dough leaves the extruder via a first outlet in the case of co-extrusion. Via a second outlet at least partially enclosing the first outlet the coating agent is arranged on the strand of food dough such that a coating layer is formed. The formed strand is then subjected according to the invention to at least two strengthening steps.

It is further recommended to divide the strand into separate parts after step iv) of the above stated method. This can be performed with for instance a knife, which cuts through the strand at determined adjustable intervals. Separate strand parts, such as sausages, are thus obtained. In contrast to the invention described in NL 2001619, it is not then necessary to divide the strand into separate units prior to the strengthening steps. Higher production speeds can hereby be achieved, and a more uniform product is obtained. Emptying of the outer ends of the separate parts (sausages) is also prevented. The film layer of the strand has further become so strong through the strengthening treatments that, following the strengthening, the strand can be more easily separated into parts.

Once the at least partially coated food strand has been formed, it is further recommended to perform the strengthening steps immediately. It is moreover recommended to perform the strengthening steps in immediate succession. In immediate succession is here understood to mean that either the strengthening steps are performed immediately one after the other or that one or more intermediate steps are performed between the strengthening steps, but wherein the treatment time of the coated food dough strand in the combined intermediate steps amounts to a maximum of 300 seconds, preferably no more than 100, and most preferably no more than 30 seconds. If the combined intermediate steps take longer, this has a negative effect on the quality of the final product. An example of an intermediate step is for instance a drying step.

It is however important that the intermediate step does not comprise of splitting the strand into parts. If this were to be done, more complex equipment is inter alia required for further transport of the separate products, and the production speed moreover becomes lower, whereby the production costs will increase.

The strengthening agents used in the strengthening steps preferably have a mutually differing composition. By varying the composition of the strengthening agent it is possible to control the structure of the coating layer more precisely. It is hereby also possible to at least partially influence determined processes, such as for instance osmosis or diffusion, which take place at the contact surface of the coating layer and the strengthening agent. Using membrane technology, such as for instance reverse osmosis, the composition of the strengthening agent of at least one of the strengthening steps can be kept at the desired level.

It is particularly recommended that in a separate strengthening step the strengthening agent comprises an enzymatic solution, salt solution of one or more salts, cross-linkers or combinations thereof.

A relatively uniform coagulation of the proteins used in the coating agent can for instance take place by making use of enzymes. Enzymes which are particularly suitable for use in the present invention are transglutaminase, laccase, bilirubin oxidase, ascorbic acid oxidase and ceruloplasmin. Reference is also made in this respect to American patent U.S. Pat. No. 6,121,013, which is wholly incorporated here by way of reference.

When the strengthening agent comprises a salt solution, it is recommended to use a sodium salt, potassium salt, calcium salt or magnesium salt. Specific salts which could be used are, among others, sodium chloride, potassium chloride, dipotassium phosphate, calcium chloride, calcium lactate, calcium acetate or calcium phosphate. These salts are recommended because they are already much used in food products and because they have a positive effect on the strength and other properties of the coating layer. Calcium salts in particular such as calcium chloride have a great effect on the strength of the coating layer, particularly when the coating agent comprises polysaccharides such as alginate.

The concentration of sodium and/or potassium salt in the strengthening agent is preferably at least 0.01% by weight. It is further recommended that the concentration of calcium salts in the strengthening agent be 0.01% by weight to 10% by weight.

Liquid smoke or derivatives thereof are particularly recommended as cross-linkers. An advantage of using these agents is that not only do they contribute toward controlling the structure of the coating layer, they also contribute toward the physical properties of the product.

The food dough as used in the method according to the present invention can be manufactured from animal or vegetable products. The food dough preferably comprises a combination of animal and vegetable products such as meat, fish, poultry, vegetable, soy protein, milk protein or proteins from chicken eggs.

The viscous coating agent is suitable for extrusion to a coating layer. This preferably takes place by means of co-extrusion. Polysaccharides which can be readily used in the coating agent of the present invention are alginate, methyl cellulose, pectin or derivatives thereof. It is also possible to use a combination of these or other polysaccharides. It is also possible for the coating agent to comprise a combination of polysaccharides and proteins. Proteins which are particularly suitable for this purpose are collagen and/or milk protein. It is particularly recommended to make use of a coating agent comprising both alginate and collagen.

The strengthening agents preferably comprise salt solutions. Suitable salts herefor are particularly calcium salts and magnesium salts. It is particularly recommended to make use of calcium chloride, calcium lactate, calcium acetate or calcium phosphate or combinations thereof in the strengthening agents.

In addition to the salt used, the pH, the treatment time and the temperature of the strengthening agent can also be varied in the separate strengthening steps.

It is particularly recommended that the pH values of the strengthening agents be the same or different in the separate strengthening steps. It is possible to effectively control the structure of the coating layer partly by regulating the pH. Depending on the composition of the coating layer and/or the food dough, the strengthening agent preferably has an acid or alkaline pH.

The treatment time of the strand in the separate strengthening steps is preferably 1 to 600 seconds, preferably 1 to 100 seconds, more preferably 1 to 60 seconds, still more preferably 1 to 40 seconds, most preferably 1 to 20 seconds. It is particularly recommended that the treatment time differs in the separate strengthening steps. This is particularly advantageous when the strengthening agents have a different composition, pH or temperature in the separate strengthening steps.

In a particularly recommended embodiment a strengthening agent is added to the coating agent prior to or during extrusion. When the coating agent comprises polysaccharides such as alginate it is recommended to use a strengthening agent comprising a calcium or magnesium salt soluble relatively poorly in water. An advantage hereof is that a longer shelf-life of the coating layer is obtained due to the relatively slow release of calcium or magnesium ions during storage of the manufactured food product, such as a sausage. The strengthening agent is preferably added to the coating agent prior to or during extrusion. The temperature of the strengthening agent in the separate strengthening steps preferably lies in the case of so-called cooked products between 25° C. and 95° C., preferably 40° C. and 90° C., more preferably 50° C. and 80° C., most preferably 60° C. and 80° C. In the case of non-cooked products the temperature in the separate strengthening steps lies between 0° C. and 30° C., more preferably 5° C. and 25° C., most preferably 5° C. and 15° C.

It is possible to already add strengthening agent with sodium, potassium or calcium salts to the coating agent prior to or during extrusion of the strand. It is advantageous here to make use of salts which are relatively poorly soluble in water, such as calcium carbonate, calcium citrate, calcium oxide, calcium phosphate, calcium silicate, calcium sulphate, calcium sulphide, calcium tartrate or mixtures thereof. An advantage hereof is that a longer shelf-life of the coating layer is obtained due to the relatively slow release of calcium ions during storage of the manufactured food product, such as a sausage. In addition, the strengthening agent can also comprise (liquid) smoke, pyrolyzed sugars, cross-linkers and/or derivatives thereof.

In an embodiment of the present method which is particularly recommended the coating agent comprises alginate. It is particularly advantageous for the coating agent to comprise 1 to 8% by weight alginate.

The general use of alginate in the manufacture of extruded food products, such as for instance sausage, is already known in the prior art. In the prior art the strand of food dough is however guided through only one salt bath having a calcium solution therein as strengthening agent. It is therefore not known in the prior art to subject the at least partially coated strand of food dough to two or more strengthening steps. In addition to alginate, the coating agent can also comprise hydrocolloids and proteins such as collagen or milk protein.

When a coating layer comprising alginate is exposed to a calcium solution, a very rapid gelling of the coating agent takes place. Due to this rapid gelling it is relatively difficult for sufficient calcium to permeate the coating layer, whereby this layer is insufficiently strengthened. Relatively high concentrations of calcium are therefore often used in the prior art. The use of high concentrations of calcium results however in variations in taste and in corrosion of the equipment. The adhesion of the coating layer to the food dough is often not optimal either, which has an adverse effect on the frying properties of the product.

A further object of the present invention is therefore to improve the strengthening of the coating layer of extruded food products such as sausages. In order to enable better control of the rapid gelling of alginate under the influence of for instance calcium, in an embodiment of the present invention the strengthening is performed in at least two strengthening steps. At least one of the strengthening steps here comprises a salt solution of for instance calcium.

When the salt solution comprises calcium, the concentration of calcium salt preferably lies in the range of 0.001 to 15% by weight, preferably 0.001 to 10% by weight.

When the coating layer comprises polysaccharides, particularly alginate, it is recommended that the strengthening agents comprise salt solutions in at least two strengthening steps, these salt solutions each being individually suitable for at least partially strengthening the coating agent.

By making use of at least two salt solutions to strengthen the coating layer on the strand a very high degree of control of the structure of the coating layer can be achieved. This has not been possible heretofore because in the prior art only one strengthening step with a salt solution was performed.

The salt solutions preferably comprise calcium, most preferably with a concentration of calcium salt in the range of 0.001 to 15% by weight, preferably 0.001 to 10% by weight. Making use of the method according to the present invention it is possible with lower concentrations of calcium in the strengthening agents to obtain the same strength as with one strengthening step with a salt solution with a relatively high concentration of calcium.

It has been found that particularly good product properties are obtained when the concentration of calcium in the strengthening agents increases in the successive strengthening steps. Thus achieved is that a full gelling of the coating layer is not immediately obtained in the first strengthening step, but that this takes place more gradually. A good coating layer is hereby obtained after a second or further strengthening step with a salt solution (preferably calcium solution). The concentration of calcium salt in the strengthening agent of the first strengthening step preferably lies between 0.001 and 1% by weight and the concentration of calcium salt in the strengthening agent of a second or subsequent strengthening step between 0.01 and 10% by weight, more preferably in a first step between 0.001 and 0.1% by weight, in a second step between 0.01 and 0.1% by weight and in a third or further step between 0.1 and 10% by weight, preferably 1 and 10% by weight.

Particularly good properties are obtained when at least one, but preferably two or more, salt solutions also comprise salts of sodium or potassium in addition to calcium. The sodium salt or potassium salt concentrations of the salt solutions preferably lie in the range of 0.01 to 5% by weight.

Without hereby limiting the invention, it is assumed that due to the presence of sodium or potassium a contest takes place between potassium and/or sodium ions on the one hand and calcium ions on the other. This competition results in the coating layer comprising alginate not fully gelling on the outside in a first strengthening step. It is hereby possible for the calcium to permeate deeper into the coating layer in the same or subsequent strengthening step. A strong coating layer is thus still obtained at lower concentrations of calcium. The adhesion of the coating layer to the food dough is moreover better.

It is particularly recommended that the concentration of sodium and/or potassium in the strengthening agent substantially corresponds with the concentration of sodium and/or potassium in the food dough. Transport of sodium and/or potassium ions from the coating layer to the food dough, or vice versa, is in this way prevented from taking place.

In a particularly recommended embodiment sodium salts or potassium salts are added to the coating agent prior to or during extrusion. A deep permeation of the sodium or potassium salts into the formed coating layer is hereby ensured. A better gelling of the coating layer will hereby ultimately take place under the influence of calcium ions.

Following extrusion of the strand of food dough with a coating layer thereon, i.e. after step iii) of the claimed method, in another embodiment of the present invention the strand is divided into separate parts. This division into separate parts can take place using a knife as described above. After the strand has been divided into separate parts, these separate parts are subjected to two or more strengthening steps.

In this embodiment it is recommended that at least two of the strengthening steps also comprise sodium and/or potassium in addition to calcium, and the concentrations of sodium and/or potassium salt in the strengthening agent lie in the range of 0.1 to 5% by weight. It is particularly recommended that the sodium and/or potassium concentrations substantially correspond with the concentrations of sodium and/or potassium in the food dough.

A second aspect of the present invention relates to a device suitable for performing the above described method.

A third aspect of the present invention relates to a coated food strand obtainable with the above described method.

The present invention will now be further illustrated using the non-limitative examples below.

EXAMPLES

Manufactured using the method according to the present invention were a number of gels representative of the coating layers of the present invention, the piercing strength of which was measured. As the results below show, using the method according to the present invention it is possible to manufacture coating layers (gels) which are as strong as or stronger than gels manufactured according to the prior art, while lower calcium concentrations can be used with the method according to the invention.

Materials and Method

A film was manufactured on the basis of Protanal SF120 (alginate). This film was rolled out using a standard stainless steel dough roller. The dough roller was provided with a recess such that a film with a film thickness of 170 micrometers was obtained each time. The films were then laid in baths with different salts and salt concentrations, as will be described in more detail below. After being exposed to the salt solution(s) for some time a so-called piercing test was performed on the films, which had by then formed a gel. This piercing test was performed in each case using a so-called texture analyser (type TA-XT-plus by Stable Micro Systems, 30 kg load cell, 5 mm diameter spherical stainless steel probe, p/5S) and the obtained data were processed using Texture Exponent Software, version 4.0.8.0.

Example 1

16 films, manufactured as described above, were placed in different salt baths. The reference films (6) were placed in a solution of calcium chloride (15% by weight) for 15 minutes. These reference films are representative of coating layers of food products placed in a salt solution as presently applied in the prior art for strengthening extruded food products, particularly sausages.

The other films (10) underwent a treatment according to the method of the present invention. These films were placed first in a first bath of 0.0050% by weight calcium chloride and 0.05% by weight sodium chloride for 5 minutes, the films (already partially) formed into gel were then placed in a second bath of 0.010% by weight calcium chloride and 0.09% by weight sodium chloride for 5 minutes, and the films were then placed in a third bath of 1.5% by weight calcium chloride and 0.7% by weight of sodium chloride for 5 minutes.

Results

The piercing strength of all films was then measured using the above described texture analyser. The results hereof are shown in table 1.

TABLE 1

Piercing strength of the films manufactured according to the
prior art and manufactured according to the invention

| Reference | Piercing strength (N) | Invention | Piercing strength (N) |
|---|---|---|---|
| Film 1 | 3.128 | Film 7 | 2.169 |
| Film 2 | 2.912 | Film 8 | 1.956 |
| Film 3 | 2.588 | Film 9 | 2.468 |
| Film 4 | 2.590 | Film 10 | 2.397 |
| Film 5 | 1.754 | Film 11 | 2.034 |
| Film 6 | 2.234 | Film 12 | 2.439 |
|  |  | Film 13 | 3.105 |
|  |  | Film 14 | 3.165 |
|  |  | Film 15 | 2.748 |
|  |  | Film 16 | 2.106 |
| Average piercing strength | 2.533 (s.d. 0.493) |  | 2.459 (s.d. 0.428) |

Clearly shown on the basis of the above is that using the present invention it is possible to obtain from a coating agent a gel which has a piercing strength comparable to that obtained in the prior art. Considerably less calcium is however necessary to achieve this effect.

Example 2

20 films, manufactured as described above, were placed in different salt baths. The reference films (10) were placed in a solution of calcium chloride (15% by weight) for 5 minutes. These reference films are representative of coating layers of food products placed in a salt solution as currently applied in the prior art for strengthening extruded food products, particularly sausages.

The other films (10) underwent a treatment according to the method of the present invention. These films were first placed in a first bath of 0.005% by weight calcium chloride for 5 minutes, the films partially formed into gel were then placed in a second bath of 0.010% by weight calcium chloride for 5 minutes, and the films were then placed in a third bath of 3.85% by weight calcium chloride for 5 minutes.

Results

The piercing strength of all films was then measured using the above described texture analyser. The results hereof are shown in Table 2 and in FIG. 1.

TABLE 2

Piercing strength of the films manufactured according to the prior art
and manufactured according to the invention

| Reference | Piercing strength (N) | Invention | Piercing strength (N) |
|---|---|---|---|
| Film 1 | 3.518 | Film 1 | 3.129 |
| Film 2 | 3.397 | Film 2 | 3.203 |
| Film 3 | 1.99 | Film 3 | 3.074 |
| Film 4 | 2.526 | Film 4 | 3.642 |
| Film 5 | 1.313 | Film 5 | 2.979 |
| Film 6 | 2.479 | Film 6 | 4.587 |
| Film 7 | 1.025 | Film 7 | 3.784 |
| Film 8 | 3.136 | Film 8 | 2.81 |
| Film 9 | 0.958 | Film 9 | 3.358 |
| Film 10 | 2.284 | Film 10 | 3.019 |
| Average piercing strength | 2.263 (s.d. 0.940) | Average piercing strength | 3.359 (s.d. 0.526) |

Clearly shown on the basis of the above is that using the present invention it is possible to obtain from a coating agent a gel having greater piercing strength than that obtained in the prior art.

The present invention is not limited to the above described embodiments, the rights sought being rather defined by the following claims, within the scope of which many possible modifications can be envisaged.

What is claimed is:

1. Method for preparing food products by means of extrusion, comprising the processing steps of:
    i) providing a food dough;
    ii) providing a viscous coating agent;
    iii) extruding a strand of food dough and extruding a coating layer at least partially enclosing the strand; and
    iv) treating the at least partially coated strand extruded in step iii) with a liquid strengthening agent during at least two strengthening steps such that the coating layer of the strand is strengthened,
wherein:
    in the at least two strengthening steps the strengthening agent comprises a salt solution comprising calcium, said salt solution is suitable for at least partially strengthening the coating layer; and
    the calcium concentration of the strengthening agent increases from the first strengthening step to the second or subsequent strengthening step.

2. Method as claimed in claim 1, wherein the viscous coating agent comprises polysaccharides.

3. Method as claimed in claim 1, wherein in a processing step v) the at least partially coated strand is divided into separate parts after performing of step iv).

4. Method as claimed in claim 1, wherein the strengthening steps are performed in immediate succession.

5. Method as claimed in claim 1, wherein the viscous coating agent comprises protein.

6. Method as claimed in claim 2, wherein the polysaccharides comprise alginate, methyl cellulose, pectin or combinations thereof.

7. Method as claimed in claim 5, wherein the protein comprises collagen, milk protein or combinations thereof.

8. Method as claimed in claim 1, wherein the strengthening agents have a differing composition in the separate strengthening steps.

9. Method as claimed in claim 2, wherein the coating agent comprises 1 to 8% by weight alginate.

10. Method as claimed in claim 1, wherein in a separate strengthening step the strengthening agent comprises an enzymatic solution and/or a salt solution of one or more salts, and/or a cross-linker.

11. Method as claimed in claim 10, wherein the salt solution comprises a sodium salt and/or potassium salt, and wherein the concentration of sodium and/or potassium in the salt solution is at least 0.01% by weight w/w.

12. Method as claimed in claim 1, wherein the concentration of calcium in the salt solution is at least 0.001% by weight w/w.

13. Method as claimed in claim 1, wherein the pH values of the strengthening agents are the same or different in the separate strengthening steps.

14. Method as claimed in claim 1, wherein the temperatures of the strengthening agents are the same or differ from each other in the separate strengthening steps.

15. Method as claimed in claim 1, wherein the temperature of the strengthening agent in a separate strengthening step is 25° C. to 95° C.

16. Method as claimed in claim 1, wherein the temperature of the strengthening agent in a separate strengthening step is 0° C. to 30° C.

17. Method as claimed in claim 1, wherein the treatment times of the at least partially coated strand in the strengthening steps are the same as or differ from each other.

18. Method as claimed in claim 1, wherein the treatment time of the coated strand in a separate strengthening step is 1 to 600 seconds.

19. Method as claimed in claim 1, wherein a strengthening agent is added to the coating agent prior to or during extrusion.

20. Method as claimed in claim 1, wherein the concentration of calcium in the salt solution is 0.001 to 15% by weight.

21. Method as claimed in claim 1, wherein the concentration of calcium in the strengthening agent of the first strengthening step lies between 0.001 and 1% by weight and wherein the concentration of calcium in the strengthening agent of the second or subsequent strengthening step lies between 0.01 and 10% by weight.

22. Method as claimed in claim 1, wherein the strengthening agent of at least one of the strengthening steps also comprises sodium and/or potassium in addition to calcium.

23. Method as claimed in claim 21, wherein the concentration of sodium and/or potassium in the strengthening agent substantially corresponds with the concentration of sodium and/or potassium in the food dough.

24. Method as claimed in claim 1, wherein the at least partially coated strand is divided into separate parts prior to or during performing of step iv).

25. Method as claimed in claim 1, wherein a calcium salt and/or sodium salt or solution thereof is added to the coating agent prior to or during extrusion.

26. Method as claimed in claim 1, wherein a calcium salt and sodium salt or solution thereof and liquid smoke and/or derivatives thereof are added to the coating agent prior to or during extrusion.

27. Method as claimed in claim 1, wherein a calcium salt or solution thereof and cross-linkers are added to the coating agent prior to or during extrusion.

28. Method as claimed in claim 1, wherein a strengthening agent with calcium ions, sodium ions, potassium ions, cross-linkers, or a combination thereof is added to the coating agent prior to or during extrusion.

29. Method as claimed in claim 1, wherein the coating agent comprises collagen, and wherein in at least one strengthening step the strengthening agent comprises an enzymatic and/or salt solution which is suitable for at least partially strengthening the coating agent.

30. Method as claimed in claim 1, wherein the salt solution comprises a solution of dipotassium phosphate.

31. Method as claimed in claim 29, wherein the concentration of collagen in the coating agent is 1 to 15% by weight.

32. Method as claimed in claim 30, wherein the concentration of dipotassium phosphate in the salt solution is 10 to 60% by weight.

* * * * *